United States Patent [19]

Okano et al.

[11] Patent Number: 4,511,970
[45] Date of Patent: Apr. 16, 1985

[54] PORTABLE TERMINAL DEVICE

[75] Inventors: Yoshio Okano; Yasuo Ōkuma, both of Seto, Japan

[73] Assignee: Hitachi, Ltd., Tokyo, Japan

[21] Appl. No.: 363,800

[22] Filed: Mar. 31, 1982

[30] Foreign Application Priority Data

Apr. 8, 1981 [JP] Japan .................................. 56-52811

[51] Int. Cl.³ ............................................. G06F 15/30
[52] U.S. Cl. ................................. 364/401; 364/900; 235/379
[58] Field of Search ...................... 364/408, 401, 900; 235/379

[56] References Cited

U.S. PATENT DOCUMENTS

| 3,611,293 | 10/1971 | Constable et al. | 235/379 |
| 3,761,682 | 9/1973 | Barnes et al. | 235/379 |
| 3,778,595 | 12/1973 | Hatanaka et al. | 235/379 |
| 4,053,735 | 10/1977 | Foudos | 364/401 |
| 4,115,870 | 9/1978 | Lowell | 364/900 |
| 4,277,837 | 7/1981 | Stuckert | 364/408 |

Primary Examiner—Jerry Smith
Assistant Examiner—Louis Woo
Attorney, Agent, or Firm—Antonelli, Terry & Wands

[57] ABSTRACT

A portable terminal device is adapted to effect transaction operation by transmitting and receiving data to and from a central unit. When transaction data is entered, the transactions including the current transaction are accumulated, and when the accumulated transaction exceeds a predetermined limit determined by a preset transaction limiting data, the transaction based on the input data is inhibited.

6 Claims, 2 Drawing Figures

PORTABLE TERMINAL DEVICE

BACKGROUND OF THE INVENTION

The present invention relates to a portable terminal device to be carried by a bank solicitor to a customer site to transmit and/or receive data to and from a central unit through a telephone set at the customer site to carry out transactions, or to be carried by an insurance company solicitor to a customer site to transmit and/or receive data to and from a central unit through a telephone set at the customer site to refer goods and prepare an agreement.

In addition to services by bank window machines (WM) for supporting transactions such as deposition and payment of money, auto-cash dispensers (CD) and auto-teller machines (ATM), banks provide solicitor services in which bank solicitors go to customer site to provide services. The transaction services in bank sites are mechanized such that WM, CD and ATM installed in the bank sites are connected to a central unit via a communication line and bank operators or customers operate the machines. On the other hand, the solicitor transaction services are handled primarily by manual operations of the solicitors and they need preparation prior to the solicitor services and postprocessing after the solicitor services (such as entry of transactions occured during the solicitor services to passbooks by the machines installed in the bank sites and return of the passbooks to the customers). Accordingly, the efficiency of solicitor work is low. Further, it is impossible to refer file content to a central unit from a customer site. Thus, sufficient customer service is not provided.

Recently, in an attempt to improve the work efficiency of the bank solicitor and enhance the customer service, a portable terminal device has been developed which can be carried by the bank solicitor to the customer site and connected to the central unit via the telephone set at the customer site to transmit data to enable the same processing as the machines installed in the bank site, at the customer site. In the field of insurance solicitors and other sales solicitors, a portable terminal device has also been developed, which enables the solicitor or salesman to carry it to a customer site and connect it to a central unit through a telephone set at the customer site so that information can be referred or an agreement can be instantly issued.

The prior art business supporting terminal devices such as MW, CD and ATM are usually permanently installed in the bank sites or automatic machine centers. Accordingly, for each transaction, the authorization of a transaction operator is checked in order to prevent unauthorized transaction.

By way of example, in order to identify a person, a secret number unique to a customer is previously provided to the customer and a magnetic card (MC) having the secret number recorded thereon by invisible magnetic record information is issued to the customer. When the customer wants to transact business by CD or ATM, the record on the MC is first read by the machine and then the customer enters the secret number which he or she memorizes, by a keyboard. The machine compares the secret number recorded on the MC and the key-entered secret number to check if there is a predetermined relation there between and permits the entry of transaction data only when the predetermined relation is detected. Such a personal identification method using MC and the secret number is well known.

The prior art transaction supporting terminal devices are usually installed permanently, need individual communication lines to connect them to the central unit and are not moved. On the other hand, the portable terminal devices as described above can be carried with ease and can be connected to the central unit from any place through the telephone set or a wireless transceiver. They are also easy to operate and handled at a public place. Accordingly, security is not sufficient by merely checking the validity of the user as is done in the prior art devices. For example, the following problems may be encountered.

(1) An authorized operator (such as solicitor) wrongfully transacts deposition by the portable terminal device beyond control of a manager and receives cash from CD or ATM, embezzles the cash and escapes.

(2) A thief who stole the portable terminal device acts in the same way as (1) above.

(3) The operator is threatened by some person and forced to make an unauthorized deposition transaction, and that person receives cash by CD or ATM, embezzles the cash and escapes.

Those problems are not resolved by merely identifying the transaction operator.

SUMMARY OF THE INVENTION

It is an object of the present invention to provide a portable terminal device which resolves the above problems. In accordance with the present portable terminal device, a limiting condition such as transaction amount or the number of transactions are prestored in the portable terminal device. When an accumulated amount of transaction exceeds the limit, the transaction by the portable terminal device is inhibited and subsequent transactions are not permitted until the limiting item is reset. In this manner, the accidental transaction amount is restricted and the stolen terminal device is made ineffective. Accordingly, the unauthorized and accidental transactions can be prevented.

In accordance with a feature of the present invention, in order to limit the transaction by the portable terminal device, limiting data for each type of transactions or each input item of transactions are stored in the portable terminal device prior to the use of the portable terminal device for the transactions. Input data for the transactions are accumulated, and the accumulated sum is checked to determine if it exceeds the limit defined by the limiting data. When the accumulated sum exceeds the limit, subsequent transaction is inhibited.

The present invention will now be described in further detail with reference to the accompanying drawings.

DESCRIPTION OF THE PREFERRED EMBODIMENTS

Figure 1:
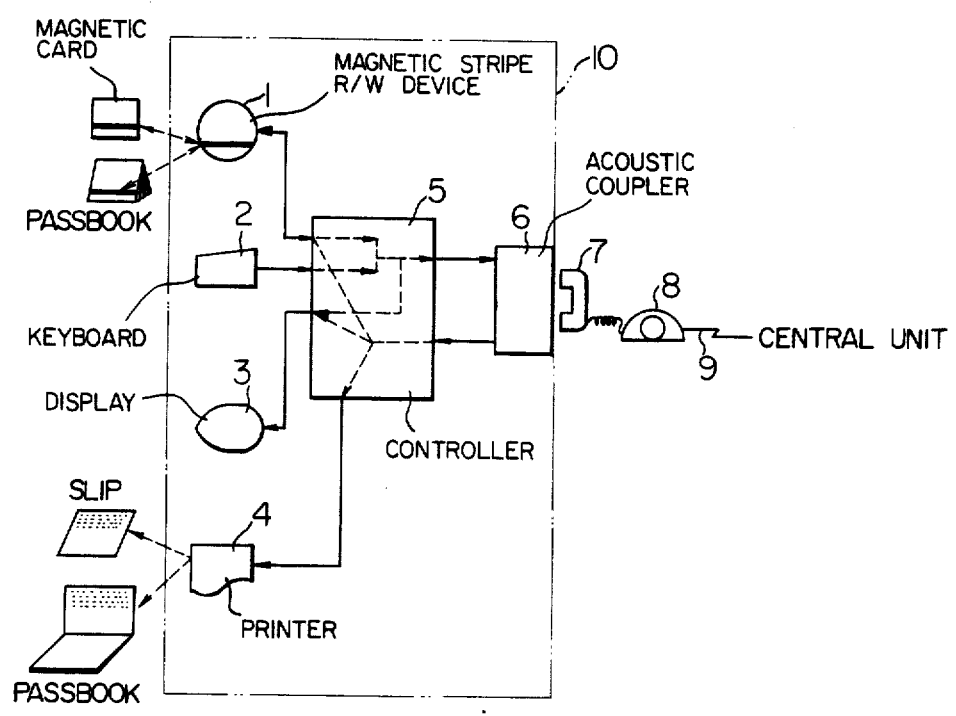
FIG. 1 shows a schematic configuration of a portable terminal device used in the present invention and connection of the portable terminal device to a central unit.

FIG. 1 shows an overall configuration of a portable terminal device in accordance with one embodiment of the present invention. The portable terminal device 10 comprises a magnetic stripe read/write device (MSRWD) 1, a keyboard (KBD) 2, a display (DISP) 3, a printer (PR) 4, a controller (CNT) 5 and an acoustic coupler (ACOP) 6.

The operation is explained below. The CNT 5 receives and retains transaction data entered by an operator through the MSRWD 1 and the KBD 2. The operator dials a telephone set 8 to call a station (central unit) to be connected and couples a handset 7 to the ACOP 6 and depresses a transmission key on the KB 2. Thus, the input data are transmitted to the central unit through a public telephone communication line 9. When a reply message is sent from the central unit, the CNT 5 receives it and discriminates a code (UI code) in the received data which specifies an output unit, and supplies the reply message to the specified unit (MSRWD 1, DISP 3, PR 4) to carry out the transaction.

When the operator manually scans a magnetic card (MC) or a passbook having a magnetic stripe (MS), which is a magnetic information recording medium, having magnetic information applied thereon, along a scan guide slot of the MSRWD 1, the MSRWD 1 reads the MS information and sends it to the CNT 5. When the CNT 5 issues an output request, the MSRWD 1 writes MS information on the MC or the passbook as the operator scans it along the scan guide slot. The KBD 2 is an operational keyboard having data keys, item keys for designating items of input data entered by the data keys, guide keys for designating displays of transaction guide information and a transmission key for instructing transmission to the CNT 5. The DISP 3 displays transaction guide information, input data, data received from the central unit and instruction messages for outputting data to the output units such as loading and unloading of forms and read/write operations of the MSRWD 1. The PR 4 prints out the displayed data and the data received from the central unit on the passbook or a slip. The ACOP 6 converts the data signals sent from the CNT 5 to acoustic signals and sends them out to the line 9 through the handset 7 and the telephone set 8, and converts the signals received through the handset 7 to data signals and sends them to the CNT 5. The CNT 5 controls the overall operation of the portable terminal device 10 such as input/output control of the units, transmission/reception control with the central unit and status control of the portable terminal device 10.

The bank solicitor carries the terminal device 10 to a customer site and connects it to the central unit through a telephone set at the customer site and transmits and receives transaction data to and from the central unit to complete the transaction.

Figure 2:
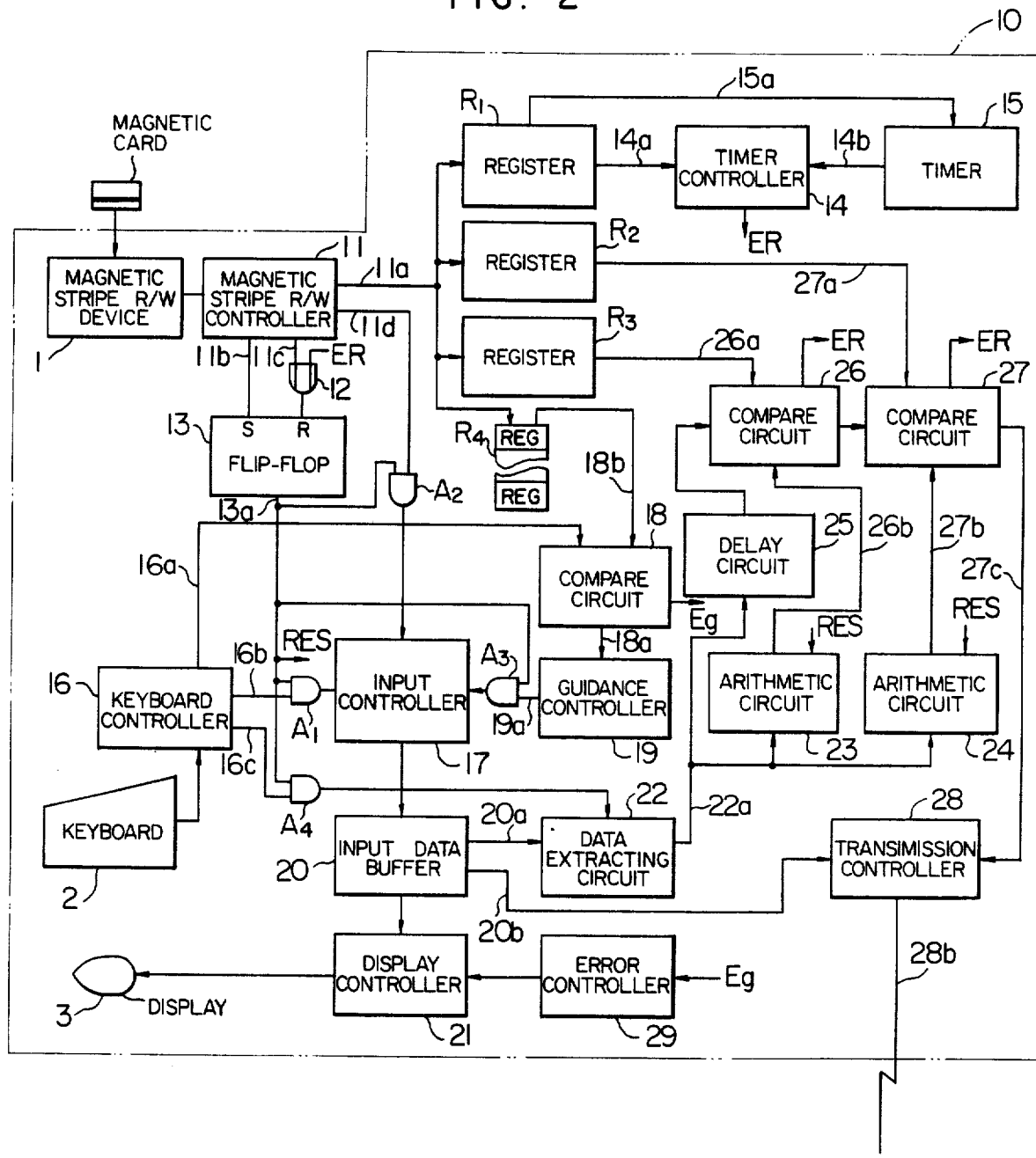
FIG. 2 shows a detailed block diagram of one embodiment of the portable terminal device of the present invention.

FIG. 2 shows a block diagram of the portable terminal device of the present invention. The MC shown in FIG. 2 represents three typical MC's. The first MC is a registration card having limiting data recorded thereon comprising a limit of usage period (TIM), a limit of total transaction amount (KIN), a limit number of transactions (KEN) and N limiting transaction codes (TRI) indicating permitted transactions. The registration card is used in a registration operation prior to the use of the present device for a transaction. In the registration operation, the transaction limiting data are stored to limit the scope of the transaction permitted by the portable terminal device and enables the device to be used in the transaction.

The second MC is an inhibit card having data for inhibiting the transaction by the present device recorded thereon. The inhibit card is used in a transaction inhibit operation for inhibiting the transaction by the present device.

The third MC is a transaction card having data such as an account number and a balance recorded thereon. The transaction card is used when the transaction is to be carried out by the present device.

The registration card is strictly managed by a manager other than a bank solicitor who carries out the transaction by the present device. The registration operation is carried out by the registration card manager. The bank solicitor receives the present device having the limiting data stored therein and carries out a transaction by a transaction card which a customer possesses. When the bank solicitor completes the solicitor service, he or she returns the present device to the registration card manager, who in turn carries out the transaction inhibit operation for the returned device by the inhibit card (the device reads the inhibit card data) and manages the device. The inhibit card is also strictly managed by the manager. The above process is carried out on every solicitor service day.

The passbook with MS may be used in place of the MC, particularly for the transaction card. However, in the following description, the MC is specifically explained.

The operation of FIG. 2 is explained below. When the operator scans the MC along the scan guide slot, the MSRWD 1 reads the MS information on the MC and sends the read data to a magnetic stripe read/write controller (MSRWC) 11. Each MC has recorded thereon a card type code for indicating the registration card, and inhibit card or the transaction card. When the MSRWC 11 receives the read data of the MC, it discriminates the card type code, and if it is the registration code, the MSRWC 11 passes the read data through a signal line 11a and stores the TIM data of the limiting data in the read data in a register $R_1$, the KEN data in a register $R_2$, the KIN data in a register $R_3$ and the N TRI data in registers $R_4$. The MSRWC 11 also sends out a signal on a signal line 11b, which is applied to a set terminal S of a flip-flop (FF) 13. When the signal is applied to the set terminal S, the FF 13 produces an ON signal on an output signal line 13a, and when it receives a signal at a reset terminal R thereof, it produces on OFF signal on the output signal line 13a. The signal on the signal line 13a is applied to AND circuits $A_1$, $A_2$, $A_3$ and $A_4$ and arithmetic circuits 23 and 24. The set enablement state of the FF 13 enables the device for the transaction.

When the TIM data is loaded to the register $R_1$ from the MCRWC 11, it sends out a signal on a signal line 15a to trigger a timer (TIM) 15. In response thereto, the TIMD 15 clears its content and starts to count time and it also triggers a timer controller (TIMC) 14. Subsequently, the TIMC 14 reads out the TIM data stored in the register $R_1$ and the timer count of the TIM 15 at a predetermined interval to compare them. When the timer count of the TIM 15 exceed the TIM data, the TIMC 14 issues an ER signal and clears the register $R_1$, and stops the count operation of the TIM 15 and clears the content of the TIM 15.

Thus, the registration operation is completed and the device is ready for the transaction. The bank solicitor receives the device thus conditioned from the manager and starts the solicitor service.

When the bank solicitor scans the transaction card through the MSRWD 1 during the execution of the solicitor service, the MSRWD 1 reads the transaction code as the card type code, and reads data including the account number and the balance and sends it out to the AND circuit $A_2$ through a signal line $11d$.

On the other hand, the bank solicitor enters data necessary to the transaction from the KBD 2. As described above, the KBD 2 has various keys and when one of the keys is depressed it sends out a code corresponding to the depressed key to a keyboard controller (KBC) 16. When the KBC 16 receives the code resulting from the depression of the data keys on the KBD 2, the KBC 16 retains it. Thereafter, when the KBC 16 receives the code resulting from the depression of the item key, it adds the item code to the stored data code and sends out the combined data to a signal line $16b$. If the KBC 16 receives the code resulting from the depression of the guide key after it has received the code resulting from the depression of the data keys, the KBC 16 adds the guide code to the stored data code and sends out the combined data to the signal line $16a$. If the KBC 16 receives the code resulting from the depression of the transmission key, it sends out a transmission instruction signal to a signal line $16c$.

When a compare circuit (COMP) 18 receives the data with the guide code from the KBC 16 through the signal line $16a$, it regards the received data as the transaction code and reads out the N TRI data stored in the registers $R_4$ sequentially and compares them with the input transaction code. If the input transaction code is not equal to any of the N TRI data, the compare circuit 18 produces an error signal Eg. If one of the N TRI data is equal to the transaction code, the compare circuit 18 sends out the transaction code to a guidance controller (GIDC) 19 through a signal line $18a$. When the GIDC 19 receives the transaction code from the compare circuit 18, it retrieves corresponding guidance data from a guidance file stored therein by using the transaction code as a retrieval key and sends out the guidance data to a signal line $19a$.

The AND circuit $A_3$ receives the signal from the signal line $13a$ and the signal from the signal line $19a$. When it receives the ON signal from the signal line $13a$ and the transaction guidance data from the GIDC 19 through the signal line $19a$ simultaneously, the AND circuit $A_3$ gates the transaction guidance data to an input controller (INPUT CNT) 17. The AND circuit $A_2$ receives the signal from the signal line $13a$ and the signal from the signal line $11d$. When the AND circuit $A_2$ receives the ON signal from the signal line $13a$ and the read data from the MSRWC 11 through the signal line $11d$ simultaneously, the AND circuit $A_2$ gates the read data to the input controller 17. The AND circuit $A_1$ receives the signal from the signal line $13a$ and the signal from the signal line $16b$. When the AND circuit $A_1$ receives the ON signal from the signal line $13a$ and the data from the KBC 16 through the signal line $16b$ simultaneously, the AND circuit $A_1$ gates and the data to the input controller 17.

When the input controller 17 receives the transaction guidance data from the GIDC 19 through the AND circuit $A_3$, it develops the transaction guidance data to a predetermined format and sends it to an input data buffer (DBUF) 20. The DBUF 20 has an area for storing the data from the MSRWC 11 and KBC 16 in accordance with the predetermined format. When the data are applied to the input controller 17 from the MSRWC 11 through the AND circuit $A_2$ and from the KBC 16 from the AND circuit $A_1$, the input controller 17 discriminates the input data and stores them in the data area of the DBUF 20. Accordingly, the input data from the KBD 2 and the MSRWD 1 are stored in the DBUF 20 in accordance with the format of the transaction guidance.

As the data are stored in the DBUF 20, a display controller (DISP CNT) 21 converts the data stored in the DBUF 20 to a display format and sends it to the DIS 3 to display it on a screen of the DIS 3. Accordingly, the input data from the KBD 2 and the MC are displayed on the DIS 3 in accordance with the format of the transaction guidance for monitoring purpose.

After the transaction data have been entered, the bank solicitor dials the telephone set to call the central unit and then loads the handset of the telephone set to the ACOP 6 of the device. When the bank solicitor thereafter depresses the transmission key on the KBD 2, the transmission key code is sent out to the KBC 16, which in turn sends out the transmission instruction signal to the AND circuit $A_4$ through the signal line $16c$. The AND circuit $A_4$ receives signals from the signal lines $13a$ and $16c$. When the AND circuit $A_4$ receives the ON signal from the signal line $13a$ and the transmission instruction signal from the KBC 16 through the signal line $16c$ simultaneously, the AND circuit $A_4$ gates the transmission instruction signal to a data extracting circuit (DATA EXTRACTOR) 22. When the data extracting circuit 22 receives the transmission instruction signal, it extracts the deposit amount data item from the data stored in the DBUF 20 through a signal line $20a$ and sends out the deposit amount data to an arithmetic circuit (ARITH) 23 through a signal line $22a$. It also sends an increment instruction signal to an arithmetic circuit (ARITH) 24 and a check instruction signal to a delay circuit (DLY) 25.

The arithmetic circuit 23 receives the signal RES from the signal line $13a$ and the signal from the signal line $22a$. It responds to the rise (transition from OFF to ON) of the signal RES from the signal line $13a$ to clear an internal register thereof. When it receives the deposit amount data from the signal line $22a$, it adds the input data to the content of the internal register and retains the accumulated data in the internal register. The arithmetic circuit 24 receives the signals from the signal lines $13a$ and $22a$. It also responds to the rise of the signal from the signal line $13a$ to clear an internal register thereof. When it receives the increment instruction signal from the signal line $22a$, it increments the content of the internal register to record the number of transactions.

When the delay circuit 25 receives the check instruction signal through the signal line $22a$, it delays the check instruction signal for a predetermined time period and then sends it to a compare circuit (COMP) 26. The compare circuit 26 reads out the accumulated deposit amount data from the arithmetic circuit 23 and compares it with the KIN data stored in the register $R_3$. When the accumulated deposit amount data exceeds the KIN data, the compare circuit 26 produces an ER signal, and when the accumulated deposit amount data is smaller than the KIN data, the compare circuit 26 sends a check instruction signal to a compare circuit (COMP) 27. When the compare circuit 27 receives the check instruction signal from the compare circuit 26, it reads out the KEN data from the register $R_2$ and the transaction count from the arithmetic circuit 24 and compares them. If the transaction count is larger than the KEN data, the compare circuit 27 produces an ER signal, and if the transaction count is smaller than the KEN data, the compare circuit 27 sends out a check completion signal to a transmission controller (TRS CNT) 28 through a signal line 27c. When the transmission controller 28 receives the check completion signal through the signal line 27c, it edits the transaction data stored in the DBUF 20 to a transmission format and sends it out to the ACOP 6 and the communication line through the signal line 28a.

The ER signals produced by the compare circuits 26 and 27 and the TIMC 14 are applied to an OR circuit 12. When the OR circuit 12 receives the ER signal, it sends out a signal to a reset terminal of the FF 13 to change the signal on the output signal line 13a of the FF 13 to the OFF state. The Eg signal from the compare circuit 18 is applied to an error controller (ERROR CNT) 29. When the error controller 29 receives the Eg signal, it produces an message indicating that the transaction 20 designated by the transaction code is in error and sends the message to the display controller 21. The display controller 21 controls the DIS 3 to display the received error message of an error display area of the DIS 3.

When the bank solicitor completes the solicitor service and returns the device to the manager, the manager scans the inhibit card through the MSRWD 1. Since the inhibit code is read as the card type code this time, the signal is produced on the signal line 11c and the FF 13 is reset through the OR circuit 12. In this manner, the transaction inhibit operation is carried out to the device and the device is disabled for a transaction.

The present portable terminal device offers the following advantages:

(1) Because of the provision of means for enabling and disabling the device for a transaction, the use of the device for unauthorized transactions during the storage of the device (not used for transaction business) and the unauthorized transaction by the stolen device are prevented.

(2) Because of the provision of means for storing transaction limiting data and means for accumulating the data corresponding to the limiting data for each transaction which is executed and inhibiting any subsequent transactions when the accumulated data exceeds the limiting data, the damage caused when an authorized operator (bank solicitor) carries out the unauthorized transactions and escapes or when the bank solicitor carrying the portable terminal device is threatened by some person and forced to perform an unauthorized transaction is confined within the limit determined by the limiting data.

(3) The types of transactions permitted by the device are registered and the transaction code entered in the transaction setting operation is checked if it coincides with the registered transactions and if it does not, the device is disabled for the transaction. Accordingly, only the transactions permitted by the device can be effected and necessary transactions can be set depending on the operator carrying the device or a particular application. Therefore, the unauthorized transaction is prevented or if an unauthorized transaction takes place the scope of the unauthorized transaction is limited. By informing only the operator of the transaction code, only the authorized operator can operate the device and the unauthorized operation by other person is prevented.

(4) The permitted usage time of the device is registered so that the device is enabled for transactions only for the predetermined time period. Accordingly, any accident which would take place when the authorized operator delays returning the device and performs an unauthorized transaction or when the device is stolen and used for an unauthorized transaction for an extended time period is prevented.

We claim:

1. A portable terminal device adapted to be carried to a customer site and to perform transaction operations by transmitting and receiving data to and from a central unit through a telephone set, said portable terminal device comprising:

a card reader for receiving a transaction card on which customer data is recorded, a first control card on which transaction limiting data is recorded for limiting the scope of transactions permitted by said terminal device, said transaction limiting data including at least one limiting item data indicative of a limit of total transaction amount to be permitted, and a second control card on which data is recorded for causing the inhibiting of transactions by said terminal device, said card reader functioning for reading out the data recorded on each of said transaction, first control card and second control cards;

a keyboard for inputting transaction data;

data buffer means coupled to said keyboard and said card reader for temporarily storing the transaction data inputted from said keyboard and the customer data read out from said transaction card by said card reader;

memory means coupled to said card reader for storing said transaction limiting data read out from said first control card by said card reader;

state storing means coupled to said card reader for holding a transaction ready state in which said terminal device is ready for a transaction when said transaction limiting data is stored in said memory means and a transaction inhibit state in which said terminal device is inhibited for a transaction when said card reader reads out said second control card;

transmitting means coupled to said data buffer means for transmitting the data stored in said data buffer means to said central unit through said telephone set during a time in which said state storing means holds the transaction ready state;

accumulating means coupled to said data buffer means operative prior to the data transmission by said transmitting means to said central unit for producing an accumulation of transactions for each limiting item of said transaction limiting data; and means coupled to said accumulation means and said memory means for checking whether or not a value of the accumulation produced by said accumulating means exceeds a value for the corresponding limiting item of said transaction limiting data stored in said memory means, said means for checking causing the inhibition of the data transmission by said transmitting means to said central unit when the value of the accumulation exceeds the value for the corresponding item of said transaction limiting data, whereby transactions with a plurality of customers are possible within a scope allowed by a manager of said terminal device.

2. A portable terminal device according to claim 1, further comprising means for setting said state storing means into the transaction inhibit state when the value of the accumulation produced by said accumulating means exceeds the value of the corresponding limiting item of said transaction limiting data.

3. A portable terminal device according to claim 2, wherein said transaction limiting data recorded on said first control card includes as a limiting item data indicative of a limit number of transactions, said memory means includes a first memory for storing the data of the limit of total transaction amount read out from said first control card and a second memory for storing the data of the limit number of transactions read out from said first control card, said accumulating means producing respective accumulations for the transaction amount and the number of transactions each time any given transaction is to be carried out, and said means for checking operating to inhibit the data transmission by said transmitting means to said central unit when either a value of the accumulated transaction amount or a value of the accumulated transaction number produced by said accumulating means exceeds either the content of said first memory or the content of said second memory.

4. A portable terminal device according to claim 3, further comprising timer means which starts its timer operation when said transaction limiting data read out from said first control card is stored in said memory means and sets said state storing means into the transaction inhibit state when a predetermined time has been ealpsed, whereby a plurality of transactions are possible only within a limited time.

5. A portable terminal device according to claim 1, wherein said transaction limiting data recorded on said first control card includes as a limiting item data indicative of a limit number of transactions, said memory means includes a first memory for storing the data of the limit of total transaction amount read out from said first control card and a second memory for storing the data of the limit number of transactions read out from said first control card, said accumulating means producing respective accumulations for the transaction amount and the number of transactions each time any given transaction is to be carried out, and said means for checking operating to inhibit the data transmission by said transmitting means to said central unit when either a value of the accumulated transaction amount or a value of the accumulated transaction number produced by said accumulating means exceeds either the content of said first memory or the content of said second memory.

6. A portable terminal device according to claim 5, further comprising timer means which starts its timer operation when said transaction limiting data read out from said first control card is stored in said memory means and sets said state storing means into the transaction inhibit state when a predetermined time has been elapsed, whereby a plurality of transactions are possible only within a limited time.

* * * * *